Dec. 14, 1965    J. L. CRAVEN ET AL    3,223,007
APPARATUS FOR SIMULTANEOUSLY PHOTOGRAPHING IDENTIFICATION
PORTRAIT AND PRINTED MATERIAL
Filed May 25, 1962    9 Sheets-Sheet 2

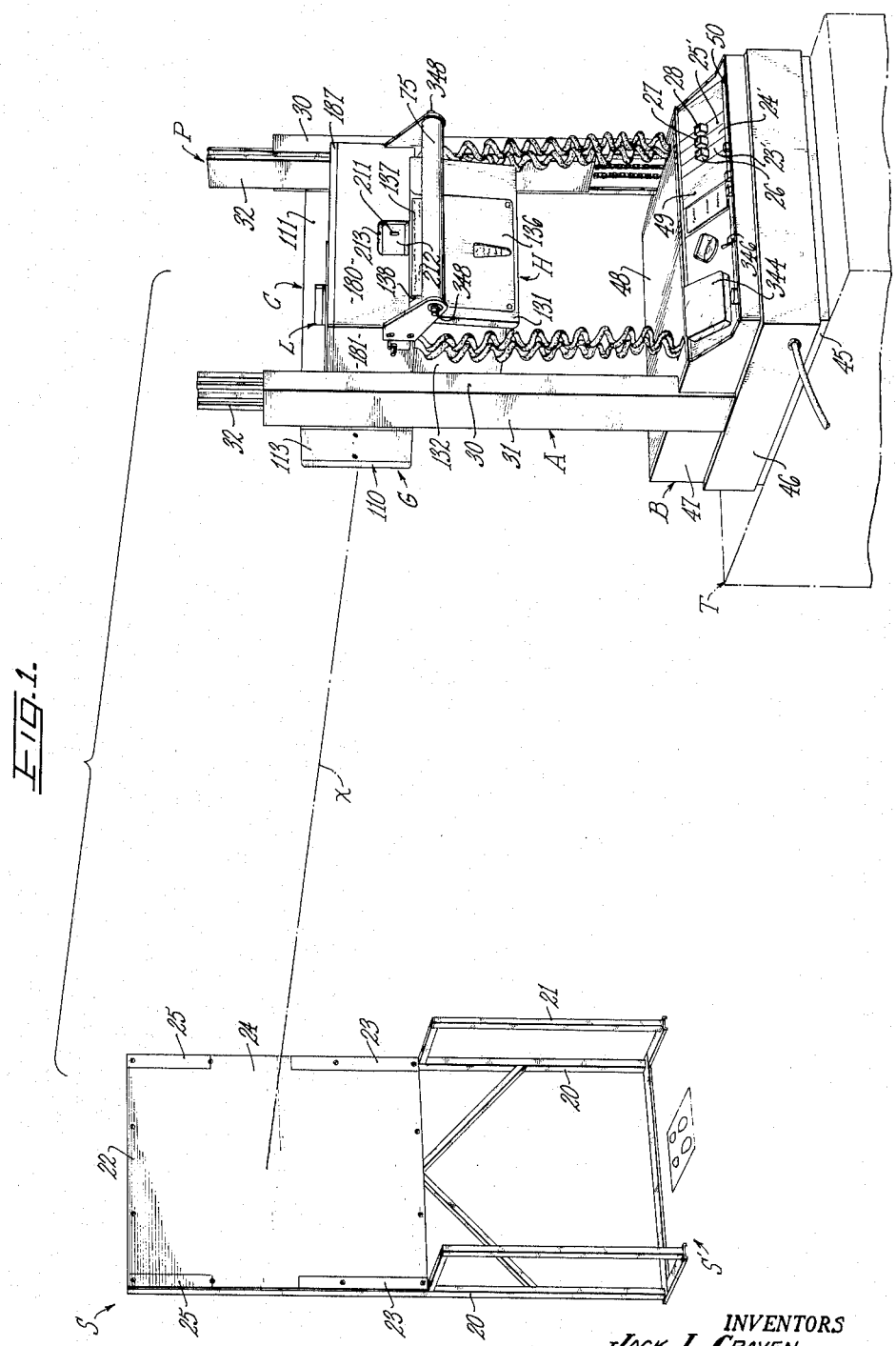

INVENTORS
JOHN B. McCARVILLE   JACK L. CRAVEN
ROY L. SWEENEY   ARTHUR M. HEDGLIN
BY   DICK T. CRAVEN

ATTORNEY

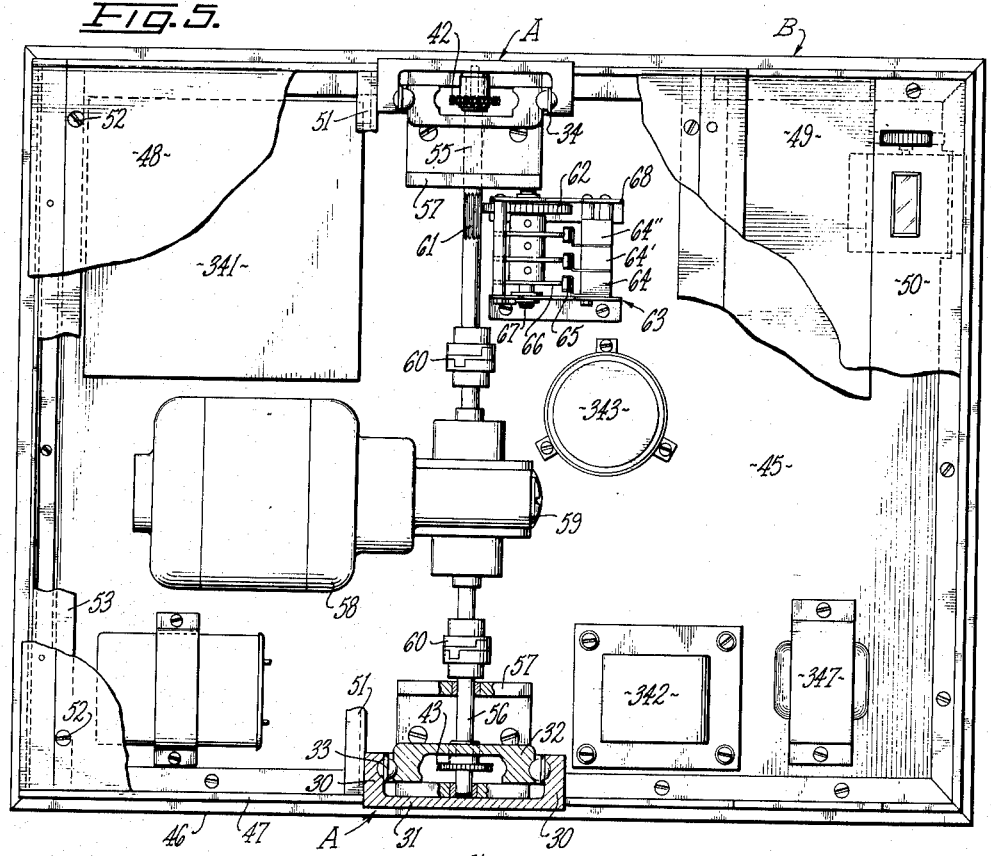
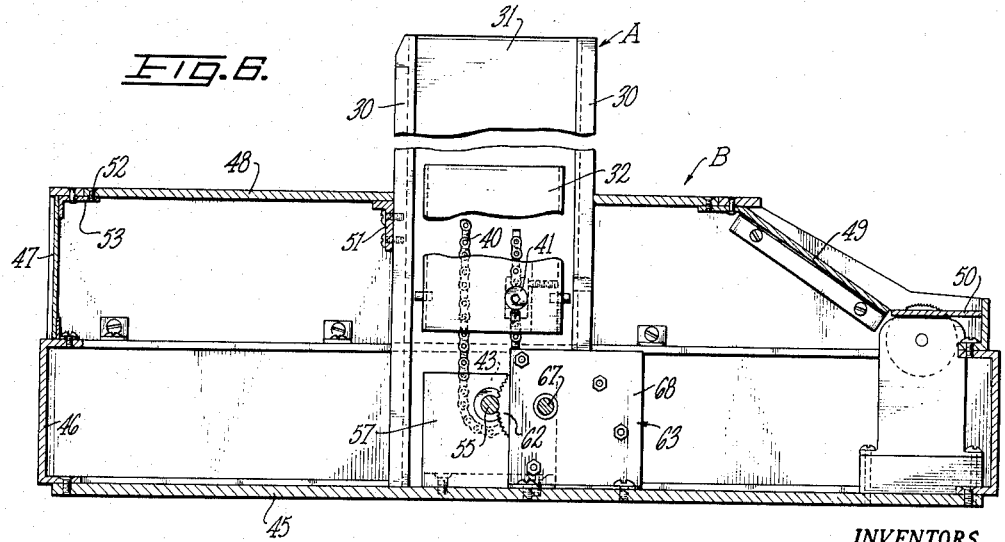

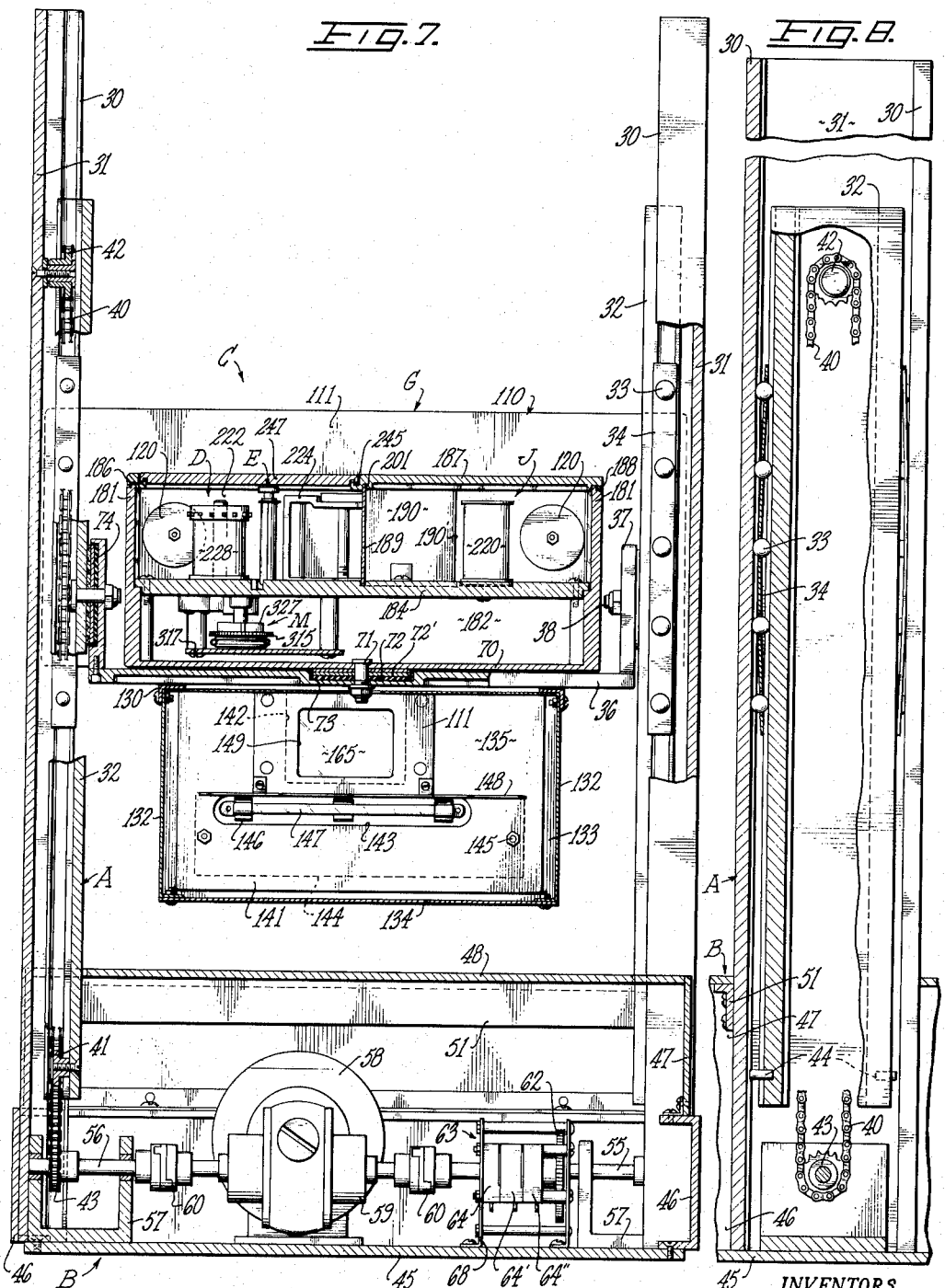

Dec. 14, 1965  J. L. CRAVEN ET AL  3,223,007
APPARATUS FOR SIMULTANEOUSLY PHOTOGRAPHING IDENTIFICATION
PORTRAIT AND PRINTED MATERIAL
Filed May 25, 1962  9 Sheets-Sheet 5
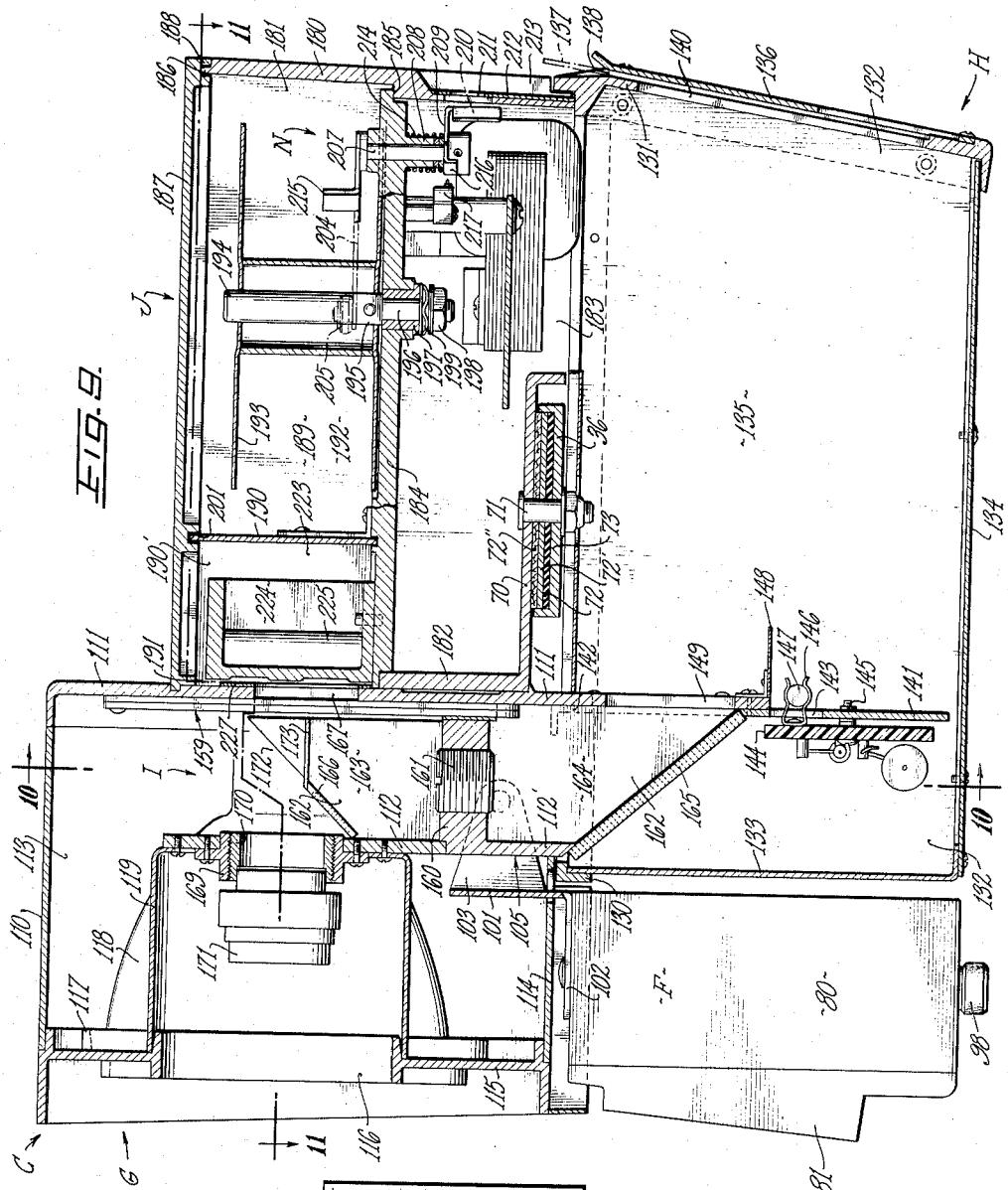
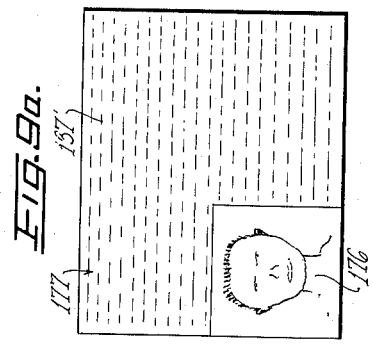
JOHN B. MCCARVILLE
ROY L. SWEENEY
JACK L. CRAVEN  INVENTORS
ARTHUR M. HEDGLIN
BY  DICK T. CRAVEN
Lynn H. Latta
ATTORNEY

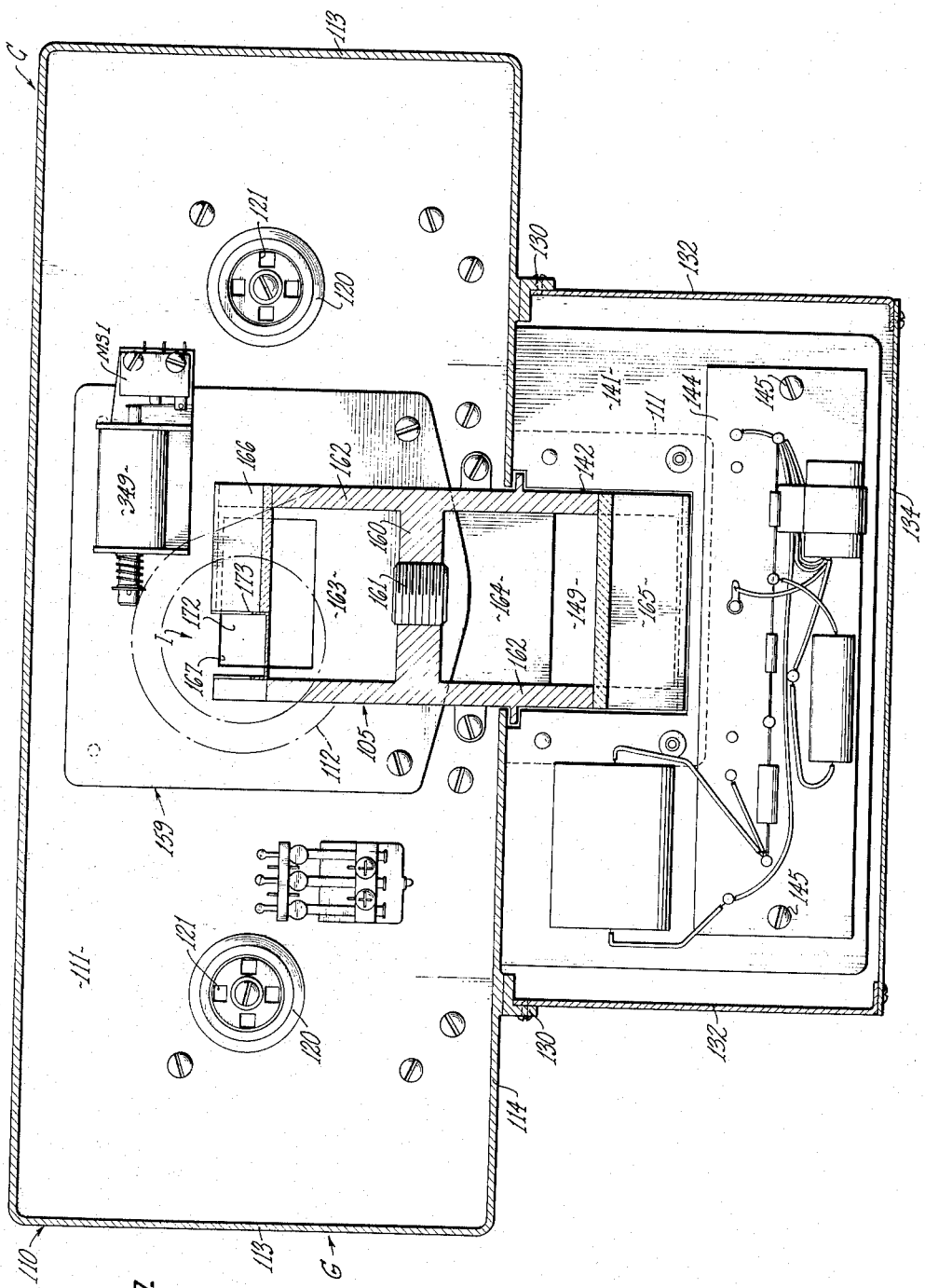

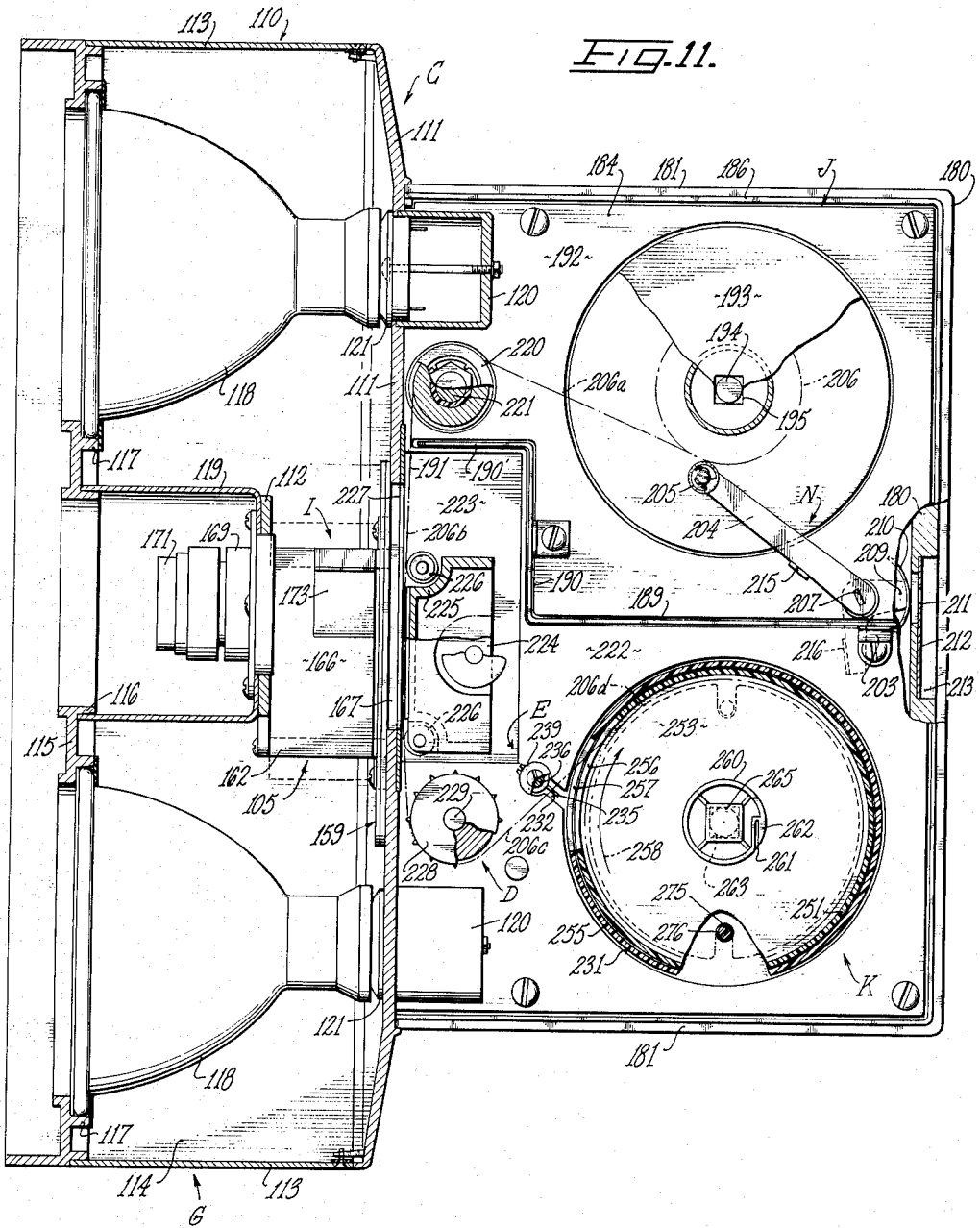

Dec. 14, 1965   J. L. CRAVEN ET AL   3,223,007
APPARATUS FOR SIMULTANEOUSLY PHOTOGRAPHING IDENTIFICATION
PORTRAIT AND PRINTED MATERIAL
Filed May 25, 1962   9 Sheets-Sheet 8
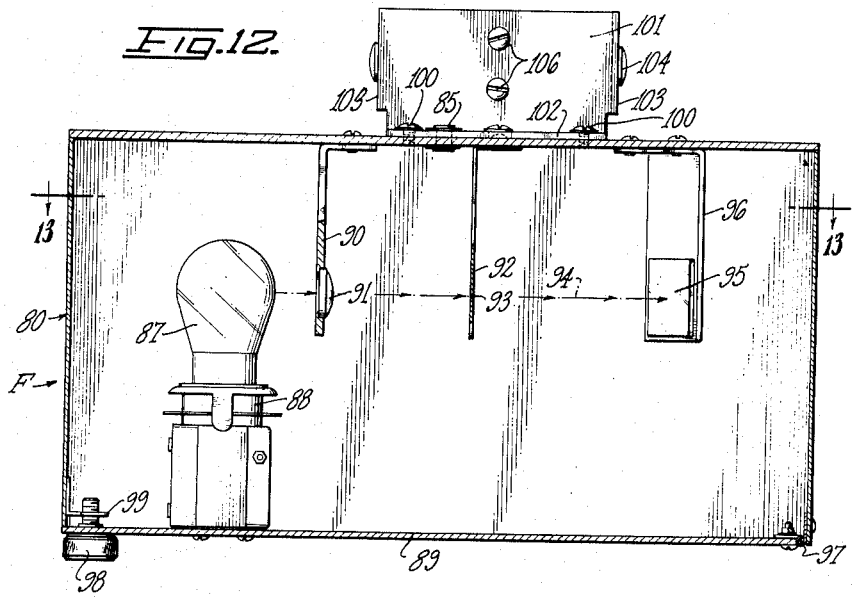
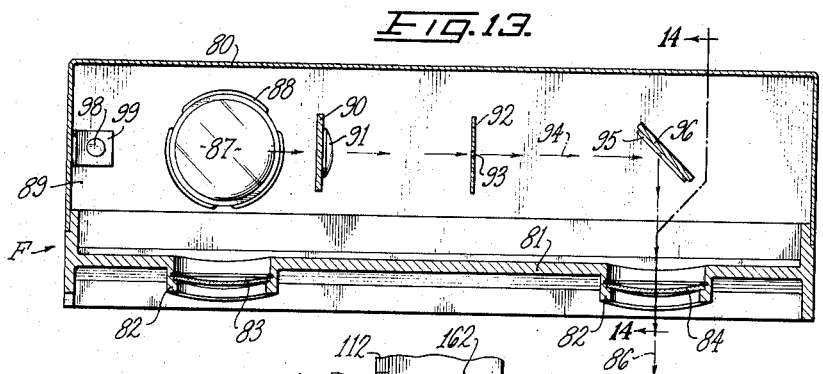
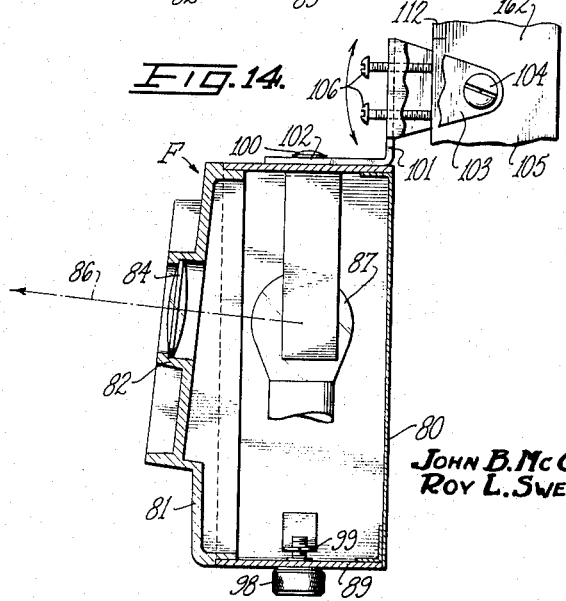
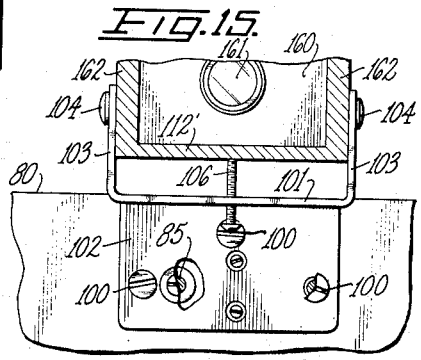
INVENTORS
JOHN B. McCARVILLE   JACK L. CRAVEN
ROY L. SWEENEY   ARTHUR M. HEDGLIN
BY   DICK T. CRAVEN
ATTORNEY Dec. 14, 1965  J. L. CRAVEN ET AL  3,223,007
APPARATUS FOR SIMULTANEOUSLY PHOTOGRAPHING IDENTIFICATION
PORTRAIT AND PRINTED MATERIAL
Filed May 25, 1962  9 Sheets-Sheet 9

INVENTOR.
JACK L. CRAVEN
ARTHUR M. HEDGLIN
DICK T. CRAVEN
JOHN B. McCARVILLE
ROY L. SWEENEY BY

Lynn H. Latta
ATTORNEY 3,223,007
APPARATUS FOR SIMULTANEOUSLY PHOTOGRAPHING IDENTIFICATION PORTRAIT AND PRINTED MATERIAL
Jack L. Craven, Anaheim, Arthur M. Hedglin, Fullerton, Dick T. Craven, East Whittier, John B. McCarville, Monrovia, and Roy L. Sweeney, Pasadena, Calif., assignors to Electro-Photo Corp., a limited partnership, San Marino, Calif., a corporation of California
Filed May 25, 1962, Ser. No. 197,764
4 Claims. (Cl. 95—1.1)

This invention relates to photographic apparatus, such as is used in the recording of an applicant's portrait upon his driver's license, I.D. cards, credit card, etc., wherein the printed format of an application blank is photographed at one scale of reproduction while the applicant portrait is simultaneously photographed at a greatly reduced scale so as to occupy one corner of the driver's license which is the result of such simultaneous photographing.

Attempts which have hitherto been made to achieve such simultaneous photographing have met with only limited success because of a lack of means for accurately positioning the camera with reference to the subject so as to properly locate the face of the subject in the corner area of the frame of film to be exposed. This difficulty arises from the widely varying sizes (especially height) of the applicant being photographed. A primary object of the present invention is to provide a camera embodying means for rapidly and accurately focusing upon the face of an applicant so as to photograph the face in accurately located relation to the area of the printed format which is being simultaneously photographed. The invention is adapted for use in printing identification cards with portrait in either right or left hand arrangement.

A further object is to provide a camera apparatus including means for pre-focusing on the subject.

A further object is to provide a camera having an improved optical system for simultaneously projecting the images of an application and an applicant's face on a frame of film.

Another object is to provide an improved light-shielded film magazine including an unexposed film reel and an exposed film cassette which is self-sealing before removal from the magazine. The invention further contemplates such an arrangement including a door for removal of the cassette, a cover plate with latching mechanism to close the door, and an interlock which requires the sealing of the cassette before the cover can be opened. Also, the invention provides for keying the cassette to the cover in a manner to prevent closing of the cover until the two sections of the cassette are adjusted to proper positioning with relation to each other.

Other objects and advantages will become apparent in the ensuing specification and appended drawing in which:

FIG. 1 is a perspective view of our improved apparatus including the camera and the screen in front of which the subject is positioned for photographing; the camera being seen from the rear;

FIG. 2 is a perspective view of the camera, seen from the front;

FIG. 3 is a left side elevational view of the camera;

FIG. 4 is a top plan view of the camera;

FIG. 5 is a plan view of the camera base, looking downwardly, with the housing largely broken away to illustrate the drive mechanism, parts of which are shown in section;

FIG. 6 is a vertical fore-aft sectional view of the base, illustrating portions of the elevating mechanism;

FIG. 7 is a vertical transverse sectional view of the camera, looking forwardly;

FIG. 8 is a vertical fore-aft sectional view through one of the support columns illustrating the elevating mechanism;

FIG. 9 is a vertical fore-aft sectional view through the camera head, looking toward the right side thereof, and illustrating the optical and film-reeling aparatus of the camera;

FIG. 9a is a face view of a license certificate produced by use of our camera;

FIG. 10 is a transverse vertical sectional view through the forward (strobe-light) section of the camera head, looking rearwardly as indicated by line 10—10 of FIG. 9;

FIG. 11 is a horizontal sectional view through the camera head, taken as approximately indicated by the line 11—11 of FIG. 9;

FIG. 12 is a vertical transverse sectional view through the portrait framing unit, looking rearwardly as indicated by line 12—12 of FIG. 3;

FIG. 13 is a horizontal sectional view of the same;

FIG. 14 is a vertical cross sectional view of the same taken on the line 14—14 of FIG. 13;

FIG. 15 is a fragmentary plan view of the same, illustrating its supporting bracket;

General description

Figure 16:
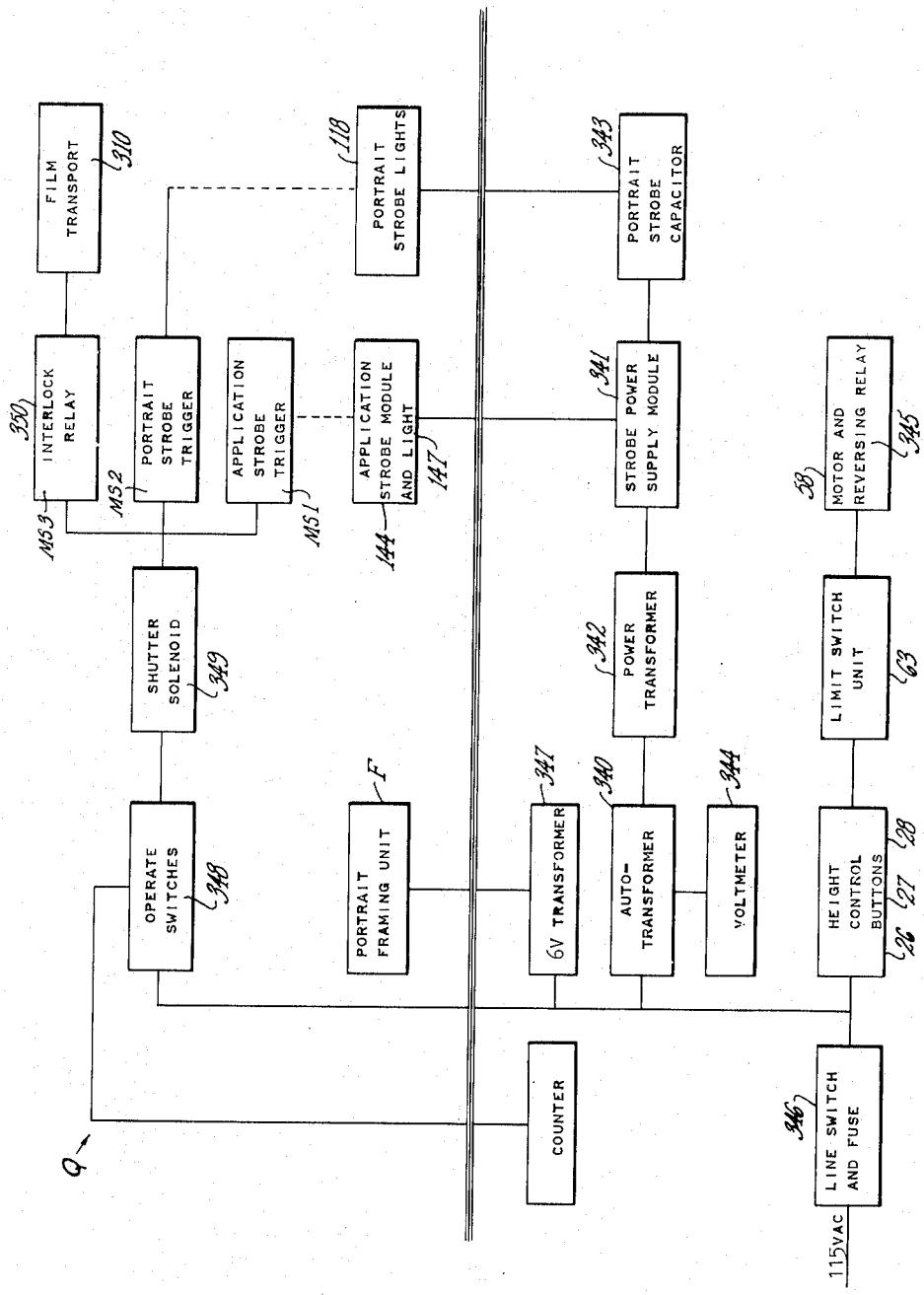
FIG. 16 is a block diagram of the electrical circuit of the apparatus.

Referring now to the drawings generally, we have shown therein, as an example of one form in which our invention may be embodied, an identification camera suitable for recording a face portrait 176 on a motor vehicle driver's license card 177 (FIG. 9a) said camera comprising, in general, a camera P and a background screen S against which a subject is posed for photographing his face simultaneously with the photographing of the printed material for the license card. The camera P may be mounted upon a suitable table or other support T so that its head may have a range of vertical adjustment corresponding generally to the height of the screen S, which is supported by a suitable standard S'. Both the standard S' and the camera support T are adapted to be supported upon a floor surface which relates the height of the camera to the screen; and, when set-up for use, the two units will be disposed at a measured distance apart, with the front face of the camera P parallel to the screen S, and with both the camera and the screen centered upon a common longitudinal axis X.

Screen S comprises the supporting standard S', which may be in the form of an open frame having vertical legs 20 at respective sides thereof and having guard rails 21 projecting forwardly from the legs 20 to provide stable support for the screen unit. Screen S comprises a panel 22 secured to upward extensions of legs 20. Along the respective side margins of panel 22 are color stripes 23 (e.g. yellow) and 25 (e.g. green), separated vertically by areas 24 which may be of the background color of panel 22.

The areas 23, 24 and 25, by color contrast, represent three zones of vertical division of the panel 22 corresponding to three ranges of height for the subjects to be photographed, namely, short, medium height and tall.

Camera P comprises, in general, a pair of support-guide columns A rising from a base B and supporting a camera head C, which is guided for vertical sliding movement bewteen columns A. Elevator cable (chain) units operate in the columns A for motor-driven vertical adjustment of camera head C. Electric motor, transmission and control mechanism (FIG. 5) are housed in the base B. Three control buttons 26, 27 and 28 are provided in the rear of base B, rising from colored stripes 23', 24' and 25' corresponding to the colors of the areas 23, 24 and 25 of the framing screen S. The elevating mechanism responds automatically to the depression of button 26, 27 or 28 respectively to adjust the camera for low, medium or high range respectively. To determine the range, the operator observes the position of the subject's head with respect to the low, medium and high areas of screen S as indicated by the color stripes 23, 24 and 25. If the subject's head appears in the medium height area, for example, the operator pushes the button 27 which is identified without mistake by its corresponding color stripe 24' corresponding to the color zone 24 of screen S. This eliminates error in the operation of the machine.

*Camera Head C* is composed of a number of units, including a portrait framing unit F (lower front); a cover and illumination unit G (upper front); an application holder and exposure chamber unit H (lower rear); a lens-mirror optical system I for simultaneously viewing both the subject and the application and transmitting their combined images, in superimposed relation, to a photographic film; and a film magazine unit J (upper rear) for automatically feeding the film, frame by frame as successive exposures are made; a footage indicator unit N associated with the film supply spool of the film magazine unit J for indicating the footage of film remaining on the spool; an exposed film cassette K; associated film drive sprocket D and film severing unit E; fog-prevention interlock mechanism L (FIG. 4) interlinking the cassette K with means for locking the cover of its compartment against opening so as to require that the cassette K be closed before the compartment door can be opened; gearing and drive motor mechanism (not shown) for synchronized windup of film into the exposed film cassette K and advancement of the film, frame by frame for successive exposures; and interlinking electrical control circuitry Q for electrical operation of the apparatus.

Detailed description

*Support columns A* are of metal channel section (FIG. 4), each embodying spaced vertical rails 30 joined by bridging webs 31. Slides 32, to which the camera head C is mounted, are likewise of channel section. Bearing balls 33, retained by apertured retainer strips 34, are engaged between semicylindrical grooves in the rails 30 and in the opposed legs of slides 32.

Camera head C is carried by a transverse beam 36 having at its ends upwardly projecting ears 37 which are connected to slides 32 by pivots 38.

Elevator chains 40 (FIG. 6) are anchored by connectors 41 to the lower ends of respective slides 32. Chains 40 have upper extremities looped over sprockets 42 (FIG. 7) rotatably mounted to the inner ends of webs 31 at the upper ends of support column A, and have lower extremities looped around sprockets 43 in base B.

Stop projections 44 (FIG. 8) in the lower ends of the respective side arms of slide channels 32, project laterally across the spaces between the bearing race grooves of slides 32 and rails 30, to prevent the lower ends of retainer strips 34 from dropping below the lower ends of the slides 32.

*Base B* comprises a bottom plate 45, a rectangular box frame 46 of channel section, and a correspondingly rectangular cover section 47 superimposed upon frame 46, having a top plate 48 and a rear control panel 49 inclined downwardly and rearwardly to meet a narrow horizontal panel 50. The respective sides of top plate 48 are notched to snugly receive the lower ends of columns A (which are cross-braced by a bar 51). Top plate 48 is removably attached by screws 52 to supporting lips 53 at the top of side wall structure 47.

Sprockets 43 are mounted on respective shafts 55 and 56 which are journalled in U-brackets 57 secured to floor plate 45. A reversible electric motor 58 drives a gear reduction unit 59 the outlet shafts of which are connected by flexible drive couplings 60 to the respective shafts 55 and 56.

Shaft 55 embodies integral spur pinion teeth 61 meshing with and driving a spur gear 62 of a limit switch unit 63 forming part of the control mechanism described hereinafter.

In general, limit switch 63 embodies three separately operable limit switches 64, 64', and 64" for automatically terminating respective elevating operations initiated by depressing buttons 26, 27, 28 respectively; each limit switch having an actuator arm carrying a follower roller 65 engaged by a respective actuator cam 66 on a common shaft 67 driven by gear 62. These parts are mounted in a suitable frame structure 68 which is secured, as a unit, to the bottom plate 45.

*Camera head C* (FIG. 9) embodies, in the housing of its film magazine unit G, a bottom panel 70 which is pivotally connected to the center of supporting yoke platform 36 (FIG. 7) by a pivot bolt 71 and a series of bearing washers 72 seated in a circular cup 73 in platform 36. With bolt 71 tightened, camera head C will be held in fixed relation to platform 36, but by applying force to it it can be adjusted around the vertical axis provided by pivot 71. Similarly, horizontal pivots 38 (FIG. 7) consist of bolts extended through the yoke arms 37 and through sets of bearing washers 74 retained in circular recesses in the arms 37, and through the slides 32, thus providing for fore-aft tilting of camera head C around the transverse horizontal axis of pivots 38 but holding the head in any position of tilted adjustment. Tilting of the head is accomplished by grasping a handle 75 attached to the respective sides of the housing of film magazine unit J. Washer 72 is of rubber material, washer 72' is of metal, and washer 72" is of felt. The sets of bearing washers 74 are of the same materials and arrangement.

*Portrait framing unit F* (FIGS. 2, 3, 12–15) comprises a rectangular housing 80 which is elongated transversely of the camera head and has its front side closed by a lens plate 81 having laterally spaced cylindrical lens frames 82 in which are mounted projection lens 84 and red filter lens 83 (FIG. 2). Filter lens 83 is utilized as a "pose" light and affords a point of interest to which the attention of the subject who is standing before screen S may be directed. Lens 84 projects a small circular pencil beam of light 86 on the face of the subject, where a small spot of light indicates that when it is positioned on the subject's upper lip, the camera is accurately aligned upon the subject's face. A pre-focused light source, consisting of an incandescent lamp 87, is mounted in a socket 88 on a removable bottom plate 89 of housing 80, and is centered behind lens 83. Mounted in a bracket 90 depending from the top of housing 80, and centered laterally with respect to lamp 87, is a condensing lens 91 which focuses the filament of lamp 87 at an enlarged ratio upon an aperture plate 92 depending from the top wall of housing 80. Aperture plate 92 has a small aperture 93 which passes a thin pencil beam of light 94 to a mirror 95 which is set at an approximately 45 degree angle to the beam 94, such as to reflect the beam forwardly through lens 84 to provide the framing spot beam 86. Mirror 95 is mounted upon a bracket 96 secured to and depending from the top of housing 82.

Removable bottom plate 89 of housing 82 has one end connected by a hinge 97 to the adjacent end of housing 82, and at its other end has an aperture through which is extended a knob-headed screw 98 which is threaded into a bracket 99 secured to the adjacent end of housing 82, thus holding the bottom plate 89 in closed position and providing for the replacement of lamp 87 when required.

Housing 82 is supported by a bracket 101 (FIG. 9) having at its lower end an integral tab 102 projecting forwardly and secured to the top of casing 82 by pivot 85 and screws 100. At its respective sides, bracket 101 has ears 103 disposed in parallel vertical planes, projecting rearwardly, embracing and connected by pivots 104 on a common horizontal transverse axis, to the respective side of a vertical flue 105 which is a part of the optical unit I of FIG. 9. Vertically spaced screws 106 are threaded through the bracket 101 into contact with the forward wall of flue 105 above and below the axis of pivots 104, and provide for vertical tilting adjustment of the framing unit F so as to adjust the projected beam 86 for height with respect to the subject. A similar horizontal adjustment is provided for by means of pivot 85 and screws 100 so as to adjust the projected light beam 86 for side-to-side alignment with respect to the subject. When properly adjusted (and with the subject at the correct subject distance) beam 86 and the optical axis of the portrait lens 171 intersect at the designated spot on the subject's face.

*Subject-illumination-unit G* (FIGS. 9, 11) comprises a transversely elongated hood 110 mounted to a relatively thick back wall 111 which also provides a back wall for the optical assembly I, the forward wall of the latter being provided, in part, by a vertical panel 112 spaced forwardly from and parallel to the back wall 111. The casing of unit G is completed by a bottom wall 114 and a front panel 115 which embodies an integral circular framing ring 116 defining a lens opening in the center of the panel, and a pair of integral framing rings 117 at respective sides of the lens opening, in which the forward ends of a pair of high-wattage strobe lamp units 118 are mounted. A lens hood 119 has a cylindrical lateral wall with an open rim receiving the rearwardly projecting portion of framing ring 116, and a flat, annular back web which is secured to the forward face of intermediate panel 112.

Mounted in the back wall 111, coaxial with framing rings 117, are receptacle units 120 for the respective strobe lamps 118, the units 120 having in their forward ends, plug sockets 121 into which the gaseous discharge bulbs of strobe lamps 118 are plugged. The receptacle units 120 project rearwardly into the respective compartments of film magazine assembly J as shown in FIG. 11.

Back wall 111 is a die-cast plate to which is mounted the magazine body die-casting and optical unit die-casting. These three units comprise the basic "framework" on which the camera unit is constructed.

*Application holder H* (FIG. 9) comprises a top frame 130; a frame 131 which projects downwardly with a slight forward inclination; a pair of side panels 132 and a front panel 133 secured to the inner faces of the respective side and front portions of a downwardly projecting flange of frame 130 and projecting downwardly therefrom; and a bottom plate 134 detachably secured, as by screws as shown, to the under faces of flanges bent inwardly from the lower margins of the respective panels 132 and 133, the rear end of bottom plate 134 resting above a forwardly projecting flange of rear frame 131. These parts provide a light-shielding housing which is suitably secured to and suspended from camera head units G and J by any suitable means (not shown). This housing provides a light-shielded chamber 135. At the rear end of chamber 135 is an application-support panel 136 which is secured to ribs projecting rearwardly from the respective sides and bottom of frame 131 to an extent somewhat greater than the thickness of a license application 137 (shown in phantom in FIG. 9) so that the latter can be inserted into a slot 138 defined between the supporting plate 136 and frame 131. The application 137 is inserted into the holder H with its printed side facing forwardly and exposed to chamber 135 in an exposure aperture 140 which is framed by the frame 131.

Extending transversely across the forward area of chamber 135, in a vertical plane and mounted to a downward projection of back wall 111, is a partition wall 141 which has, in its upper central area, a rectangular opening 142 and below the opening 142, a slot opening 143 extending substantially full width across the chamber 135. A strobe module 144 is secured, by studs 145, to the rear side of partition 141 and projects upwardly past the slot opening 143, where it supports a pair of brackets 146 for a stroboscopic lamp 147 of the gas tube type. Immediately above the lamp 147, a light shield 148 is supported by L-brackets from the lower end of the back wall 111. Just above the shield 148, a rectangular aperture 149 in the wall 111 provides for passage of light rays from application exposure chamber 135 into the optical unit I.

*Optical unit I* embodies a camera shutter 159 mounted to the rear wall member 111. The unit I has, as a housing member (also mounted to the rear wall member 111) the hood 110, formed as an integral casting including a horizontal bulk-head 160 which has a centrally disposed, internally threaded vertical bore in which is mounted (by threading, for adjustment (a triplet gathering lens unit 161. Partition wall 105 is an integral part of this casting, projecting downwardly from the forward side of bulk-head 160. This casting also includes integral vertical side walls 162 (FIG. 10) projecting downwardly and upwardly from the respective side extremities of bulk-head 160 in a H-configuration in vertical transverse section, and cooperating with the vertical transverse walls 105 and 111 to define a vertical flue of rectangular tubular (horizontal) cross section which is partitioned by the bulk head 160 into an upper chamber 163 and a lower chamber 164. The lower end of this tubular flue structure is bias-cut in a plane inclined downwardly and rearwardly at an angle somewhat steeper than 45 degrees. A first surface mirror 165 is supported against the lower edges of the side walls 164 and front wall 105 which lie in this inclined plane, being secured in place by suitable means. Horizontally, the mirror registers with the opening 149 so as to receive light rays reflected from application 137 (when illuminated by strobe light 147); and it registers vertically with the flue chamber 164 so as to transmit such light rays upwardly through lens unit 161 into flue chamber 163.

The upper ends of side walls 162 are cut on a bias in a plane inclined forwardly and downwardly, subtending a dihedral angle of somewhat more than 90 degrees with mirror 165. Mounted against these inclined upper edges is a first surface mirror 166 which functions to transmit rearwardly, through a rectangular aperture 167 in rear wall 111, and into the film magazine unit J, the image of application 137 projected upwardly through lens unit 161.

The path of the light rays thus transmitted from application 137 into the film handling and recording unit J is indicated by the broken lines 168 in FIG. 3.

The front panel 112 of the flue structure of unit I is recessed into a shallow shoulder along the upper forward margin of bulk-head 160 and is attached by suitable fasteners (not shown) to the forward margins of the upwardly projecting portions of side walls 162. Secured in a circular aperture in panel 112, coaxial with the larger aperture in the back web of lens hood 119, is a bezel 169 into which is threaded (for axial adjustment) a collar 170 mounting a portrait lens unit 171. The upper leftward corner of mirror 166 (viewed looking rearwardly as in FIG. 10) is cut away to provide a rectangular notch 172 which is approximately centered on the optical axis of lens unit 171 so that light rays carrying the image of a subject posed in front of framing stand S can pass the mirror and into the corresponding corner portion of aperture 167. A passage for these light rays, shielded from the light rays projected upwardly through lens unit 161, is provided for by a shield 173 of U-section transversely, which is secured to the inner face of the adjacent upwardly projecting wall member 162 and the two walls of the mirror 166 formed by notch 172. The light beam carrying the portrait of the subject, as it passes through lens unit 171 and into the corner of window 167, is indicated by broken lines 175 in FIG. 3. The relationship between the portrait aperture (notch) 172 and the aperture 167 is seen in FIG. 10. A corresponding relationship between the subject's portrait 176 and the image 137' of application 137, appearing as a face photograph and printed matter respectively on the driver's license 177, is shown in FIG. 9a.

*Film magazine unit J* has a housing comprising rear, lateral and forward upright walls 180, 181 and 182 respectively (FIG. 9) bottom wall 70 which projects rearwardly from forward wall 182, terminating in spaced relation to the lower margin of rear wall 180 to define an opening 183, and a false bottom 184 which rests marginally upon a shoulder 185 in the intermediate height of the upright walls 180–182. The upright walls 180, 181 have a rim lip 186 projecting upwardly at their inner faces. A cover plate 187 has a downwardly projecting rim 188 of inverted channel section defining a groove receiving the lip 186 to provide a light-sealing coupling between the cover plate 187 and the upright casing wall. A partition 189 of Z-shape (FIG. 11) extends forwardly from rear wall 180, is off-set rightwardly at 189 and then extends forwardly in a forward end portion 190 which is spaced from the rear wall 111 by a narrow gap 191. Between partition 189 and the rightward side of the magazine unit housing is a chamber 192 in which is disposed an unexposed film reel 193.

In the cover plate 187 is a reverse Z-shaped grooved lip 201 which receives the upper margin of Z-shaped partition 189, 190 and provides a light seal between the unexposed film compartment 192 and the cassette compartment hereinafter referred to.

The cover plate 187 is normally latched in closed position by suitable latch means (not shown).

Reel 193 is mounted upon a spindle 194 which at its base has a squared shank 195 reecived in a correspondingly square aperture in the bottom web of the reel and thus drivingly coupled thereto. Below the shank 195, spindle 194 has an integral stem 196 which is journalled in a bearing bushing 197 in false bottom 184. Engaged between the lower end of 197 and a nut 198 which is threaded on to the lower end of stem 196, is an assembly of washers 199 comprising a marcel washer spring sandwiched between flat washers and functioning as a slipping clutch or brake which imposes a light yielding braking load on the spindle 194, opposing free rotation of the reel 193.

In a forward inward corner of compartment 192 is a footage indicator comprising a follower roller 205 adapted to ride against a roll of unexposed film 204 on reel 193. Roller 205 is journalled on the end of a follower arm 204 extending between the flanges of reel 193, the other end of the arm 204 being secured to the upper end of a fulcrum shaft 207 which is journalled in a bearing boss 208 on the under side of false bottom 184. Secured to the lower end of fulcrum shaft 207 is a bell crank lever 209 having a forwardly projecting arm terminating in a downwardly bent segmental cylindrical footage-indicator head 210. Footages imprinted upon the convex outer face of head 210 are displayed through a window 211 in a form of a vertical slot in a face plate 212 mounted in a window recess 213 in rear wall 180. A coil spring 214, coiled around boss 208, has its upper end anchored in false bottom 184 and its lower end secured in bell crank 209, and is tensioned so as to bias the bell crank 209 for rotary movement in the clockwise direction as seen in FIG. 11, thus maintaining the follower roller 205 in contact with the film roll 206 and gradually moving the indicator head 210 leftward as viewed from the rear through slot 211, as the film is gradually unreeled from the reel 193. On the follower arm 204 is a handle tab 215, integral with and projecting upwardly from a side margin thereof, for retracting the follower arm 204 to a position clearing the reel 193 so that an empty reel can be removed and replaced by a full reel.

Associated with the footage indicator just described, is a film-feed lockout comprising an integral bearing pad 216 on an arm of bell crank 209 and other elements forming no part of the present invention.

An idler roller 220 (FIG. 11) is rotatably mounted on a journal post 221 anchored in and projecting upwardly from false bottom 184 in a forward corner of compartment 192 adjacent partition end 190 and tangent to a transverse vertical plane passing through gap 191. A stretch of film 206a, leaving the roll 206, extends around the idler roller 220 and thence through the gap 191 in a transverse stretch indicated at 206b. Defined between partition 189 and the leftward side wall of unit J housing is an exposed film compartment 222 in which the exposed film cassette K is located. Compartment 222 has a wing 223 projecting laterally therefrom into an adjacent corner area of compartment 192 and sealed therefrom by the offset 189 and end portion 190 of the partition. Disposed partly in the wing 223 and partly in the adjacent corner of compartment 222 is a box shaped platen 224 having recessed corners 225 in which are mounted guide rollers 226. Platen 224 is disposed directly behind aperture window 167. Platen 224 and rollers 226 cooperatively block the passage of light rays into compartment 222 or its wing 223, so that only the frame of film directly behind the window 167, is exposed to the light beam passed by the camera shutter 159. The stretch of film 206b travels between the platen 224 and a thin bearing plate 227, in which the exposure aperture 167 is framed, and thence passes around a drive sprocket 228.

*Film drive D* comprises the sprocket 228, which is mounted on a drive shaft 229 extending upwardly through false bottom 184 and journalled in a suitable bearing therein. From the sprocket 228, the film has a stretch 206c extending into the cassette K.

*Film cutoff knife E* comprises a blade 235 secured in the lower end of a plunger 236 and projecting radially therefrom in the slot 232, beneath the lower edge of film stretch 206c. At its upper end plunger 236 has a knob 239.

*Cassette K* has its bottom disposed in a shallow circular recess 231 in false bottom 184. Communicating with the forward side of recess 231 (FIG. 11) is a slot 232 disposed at substantially right angles to the film stretch 206c which crosses above it. Knife blade 235, in its rest position, is disposed in slot 232.

In the cover plate 187 (FIG. 4) above the compartment 222, is a rectangular doorway 245 which is normally closed by a door 247 of correspondingly rectangular shape. The cassette K comprises intercoupled top and bottom sections including elements designated by numerals 251 through 265 as seen in FIG. 11, forming no part of the present invention.

*Electrical description*

Our identification camera is comprised of two basic units: a base unit and a camera unit. The primary electrical components of these two units are:

*Base unit*: The base unit contains the elevating system, main power switch, voltmeter, voltage regulator, transformers, strobe power pack, fuses, and exposure counter, indicator lights, and a three-conductor input cable.

*Camera unit*: The camera unit is mounted by a yoke assembly to the vertical elevating columns of the base unit. This unit contains a portrait framing light source, a film transport mechanism, a focal plane shutter, two portrait strobe lamps, a copy strobe module, two operate push button switches, a relay, a transport interlock switch, a film exhaust switch, a film transport push button switch, a film exhaust override push button switch, and three inner system switches.

The electrical continuity between the base and the camera units is maintained through four (4), four-conductor coiled cables.

*Control circuit Q* comprises a group of components in base unit B and other units in camera unit C, as follows:

*The base unit B* contains an auto-transformer 340 mounted to control panel 49 which is used to adjust the line voltage to strobe power supply module 341. This module, along with the associated power transformer 342, portrait strobe capacitor 343, and strobe module 144 located in camera head C, provides the necessary circuitry and D.C. voltage to fire strobe lights 118 and 147. A voltmeter 344 on control panel 49 affords the operator visual indication of proper adjustment of voltage level to the strobe circuitry.

Mounted to control panel 48 is the three-position push button control switch for vertical height adjustment of camera head C. When any one of the three control buttons (26, 27, 28) is depressed, power is transmitted through limit switch unit 63 to motor 58 driving gear reduction unit 59. Power to motor 58 is sustained until camera head C has moved to the selected position and the corresponding limit switch 64 of switch unit 63 (FIG. 5) is actuated by cam 66 as it is driven by gear 62 meshing with pinion teeth 61 and the circuit to motor 58 is automatically broken. Included in the circuit is a 3 PDT relay 345 for automatically reversing the direction of motor 58 and, depending on the initial position of camera head C when a respective control button 26, 27 or 28 is depressed, driving camera head C either up or down.

*Camera unit C.*—When the line switch 346 located in base B is turned to the "on" position, there is power to the 6-volt transformer 347 in base B which supplies current to the incandescent lamp that is used in portrait framing unit F of the camera head C.

This lamp is fed through a pair of normally-closed camera operate switches 348 located on either end of handle 75. When either camera operate switch is actuated, the lamp extinguishes. Simultaneously with this occurrence, the coil of the shutter operation solenoid 349 in camera head C and the frame counter in base B are actuated. The armature of the shutter solenoid 349 actuates a stack of three (3) microswitches, MS1, MS2 and MS3. One switch triggers strobe light 147 for exposure of the application card, the second switch triggers strobe lights 118 for exposure of the subject portrait, and the third switch sends a pulse to a camera interlock relay 350 which, when actuated, breaks the circuit to the shutter solenoid coil and thereby allows the shutter to close. The relay remains electrically latched. When the shutter solenoid has relaxed, power is transmitted through the normally-closed contacts of the switch MS3 that actuated the relay and then through one set of the now actuated relay contacts to the magazine drive motor 310.

I claim:

1. In a camera, in combination: an easel including a base and upright parallel columns anchored to the base; a camera head having a pair of slides embraced between and guided by said columns for vertical travel adjusting the height of said camera head; endless drive chains each extending vertically between a respective column and an adjacent slide and each anchored at one point to the respective slide; a pair of sprockets journalled on each column in vertically spaced relation with a respective chain trained therearound; a reversible electric motor in said base driving the lower sprockets of said pairs; a plurality of electric circuits for energizing said motor, each circuit having a manually-operable starting switch therein for initiating a driving operation in which the camera head is moved toward a predetermined position of elevation; and a limit switch in each circuit, automatically responsive to arrival of the camera head at one of said predetermined positions, to stop the movement at that position.

2. In an identification certificate camera, in combination: a subject positioning stand including a framing screen having separately identifiable indicia at a plurality of selected subject head-heights; a camera head; a supporting easel; slide means mounting said camera head for height adjustment in said easel, and means for vertically adjusting said camera head in said easel to a lmited number of predetermined positions corresponding to the respective head-heights of said screen indicia, said vertically adjusting means including a reversible electric motor, a plurality of electric circuits for energizing said motor, each circuit having a manually-operable starting switch therein for initiating a driving operation in which the camera head is moved toward a predetermined position of elevation, a limit switch in each circuit, automatically responsive to arrival of the camera head at one of said predetermined positions, to stop the movement at that position, and indicator means associated with said starting switches for identifying them respectively with the respective head-height indicia of said screen.

3. A camera as defined in claim 2, wherein said head-height indicia consist of vertically successive areas of contrasting colors extending vertically on said screen in background relation to a subject's head for determining his head height within a range indicated by a respective color, and corresponding colors embodied in said starting switch-associated indicator means, for correlating the latter to said indicia by color comparison.

4. In a camera, in combination: an easel including a base and upright parallel columns anchored thereto; a camera head having a pair of slides embraced between and guided by said columns for vertical travel adjusting the height of said camera head; endless flexible drive elements each extending vertically between a respective column and an adjacent slide and each anchored at one point to the respective slide; a pair of rotary drive elements journalled on each column in vertically spaced relation with a respective flexible drive element trained therearound; a reversible electric motor in said base driving the lower rotary drive elements of said pairs; a plurality of electric circuits for energizing said motor, each circuit having a manually operable starting switch therein for initiating a driving operation in which the camera head is moved toward a predetermined position of elevation; and a limit switch in each circuit, automatically responsive to arrival of the camera head at one of said predetermined positions, to stop the movement at that position.

References Cited by the Examiner

UNITED STATES PATENTS

| 2,017,096 | 10/1935 | Hogan | 95—31 |
| 2,095,849 | 10/1937 | Wittel | 95—31 |
| 2,339,657 | 1/1944 | Smith | 95—1.1 X |
| 2,570,668 | 10/1951 | Halpern | 88—24 |
| 2,622,496 | 12/1952 | Owens | 95—31 |
| 2,642,790 | 6/1953 | Scholkemeier | 95—44 |
| 2,868,064 | 1/1959 | Henkel | 95—1.1 X |
| 2,896,522 | 7/1959 | Stein | 95—1.1 |
| 2,953,073 | 9/1960 | Birch | 95—1.1 |

JOHN M. HORAN, *Primary Examiner.*

NORTON ANSHER, *Examiner.*